Aug. 3, 1948.                D. E. VAN DENBERG                2,446,499
                                COFFEE FILTER
                              Filed May 18, 1945
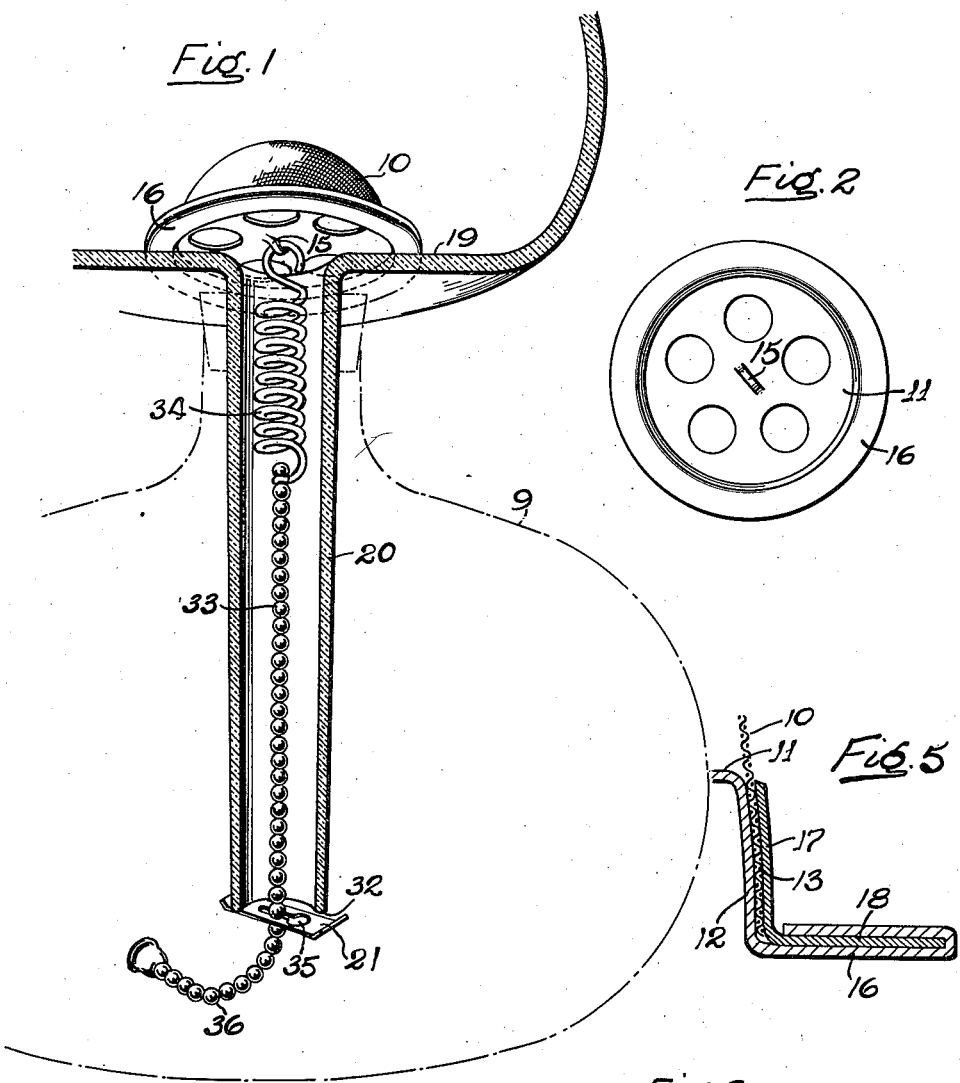
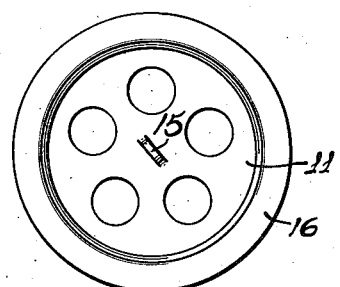
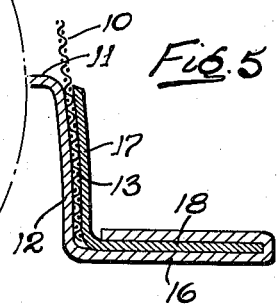
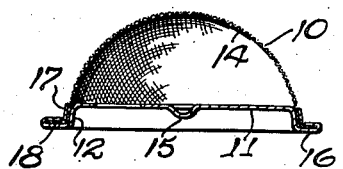
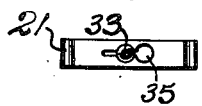
INVENTOR
Donald E. Van Denberg
ATTORNEYS Patented Aug. 3, 1948

2,446,499

UNITED STATES PATENT OFFICE 2,446,499

COFFEE FILTER

Donald E. Van Denberg, Rockford, Ill.

Application May 18, 1945, Serial No. 594,453

1 Claim. (Cl. 210—162)

This invention relates to strainers for glass infusion coffee brewers and the like.

Among other objects, the invention aims to provide a wire cloth strainer of improved efficiency and durability.

Another object is to provide an improved and adjustable means for removably holding the strainer in place.

Other objects and advantages will become apparent from the following description of one device embodying the invention and shown in the accompanying drawing.

In said drawing:

Figure 1 is a perspective view of the strainer element in position in a coffee brewer and illustrating its connection thereto.

Fig. 2 is a bottom view of the strainer, omitting the connecting means.

Fig. 3 is a vertical section of the strainer.

Fig. 4 is a plan view of a holding element.

Fig. 5 is an enlarged fragmentary section of certain parts shown in Fig. 3.

In coffee brewers of the type here involved straining of the coffee, that is, separation of the liquid from the coffee grounds is generally aided by the partial vacuum produced upon condensation of the steam inside of the sealed pot 9. However, often this vacuum is lost by leakage at the seal, whereupon filtering through the ordinary filtering device is objectionably slow. To compensate therefor, the filtering devices are made courser to hasten filtering with consequent reduction in clarity and quality of the coffee brew. Attempts have been made to improve clarity by the use of large-area semispherical screens, but it has not heretofore been possible to fabricate a durable and efficient screen of this character. The screen must necessarily be of very fine mesh wire cloth which alone is relatively flimsy and incapable of maintaining its shape.

According to my invention, I employ a straining element in the form of a fine mesh wire cloth 10 shaped to general semispherical form which is supported and reinforced in such a way as to render it durable and to maintain its efficiency through long periods of use. The strainer cloth is supported and reinforced adjacent its free edge by an annulus in the form of a stiff metal ring 12 engaging the upwardly extending lower margin 13 of the strainer thereby tending to stiffen and support the arch 14 of the strainer. The latter is thus able to present a large filtering surface which does not readily clog. Ring 12 is provided with some means by which the strainer may be anchored in place. Any suitable means such as a bar or, as here shown, a perforated web 11 may be employed for this purpose. An integral loop 15 (formed by striking down a loop of metal) provides a connection by which the strainer is removably anchored in place as presently described.

Ring 12 is provided with a laterally extending flange 16 to form the strainer bearing surface with the brewer. Cooperating with the supporting ring 12 is an outer ring 17 shaped to the outer contour of the strainer opposite ring 12, between which and ring 12 the margin 13 of the screen is firmly held to aid in effecting the stiffening and supporting of the strainer arch as above described. Ring 17 is preferably provided with a laterally extending flange 18 around which the outer margin of flange 16 is crimped and by which ring 17 and flange 12 are held in firm clamping relation over the strainer margin 13 (see Fig. 5). If desired, the screen margin may additionally be soldered to ring 12.

The lower surface of flange 16 is flat and seats against the surface 19 of the brewer around the infusion tube 20. The multiple thicknesses of metal embraced within the crimped over flange 16 stiffens the latter and prevents distortion which would permit escape of coffee grounds between the strainer and the surface 19 of the brewer.

The strainer is removably held in seated position by an adjustable holder 21 (in the form of a bar narrower than the internal diameter of the tube) which equally bears against opposite regions of the end 32 of the tube and which is connected to the strainer by a flexible and resilient connector. The latter is in the form of a so-called "shot" chain 33 and a tension spring 34 connecting the chain to the strainer. One end of the spring is hooked to the connection 15 and the other is bent snugly around the chain between a pair of shot. The bar 21 is provided with a bayonet slot 35 to receive the chain 33 and by which the spring tension and effective length of the connector may be adjusted to tubes of varying lengths. To release the connector the spring is elongated by pulling down the free end 36 of the chain until the bar 21 can be tilted and inserted endwise in the tube 20.

Obviously, the invention is not limited to the details of the illustrative apparatus since these may be variously modified. Moreover, it is not indispensable that all features of the invention be used conjointly, since various features may be used to advantage in different combinations and subcombinations.

I claim as my invention:

A strainer for a vacuum type coffee brewer having an infusion tube comprising in combination a strainer adapted to seat in the entrance end of said tube, a flexible connection longer than said tube attached at one end to the underside of said strainer for holding the strainer seated in said entrance end, said connection including a resiliently extensible portion adjacent the strainer and a lower end portion having a multiplicity of enlargements interconnected with each other and spaced longitudinally along the flexible connection and a cross-bar longer than the diameter of said tube and apertured intermediate its ends to provide a recess permitting the passage of said enlargements therethrough, and an adjoining slot narrower than the diameter of said enlargements but loosely receiving any part of said connection intervening between said enlargements whereby to permit tilting of the cross-bar to a position alongside said connection and thereby allow withdrawal of the connection endwise through said tube.

DONALD E. VAN DENBERG.

REFERENCES CITED

The following references are of record in the file of this patent:

UNITED STATES PATENTS

| Number | Name | Date |
|---|---|---|
| Re. 22,291 | Campbell | Mar. 23, 1943 |
| 63,879 | Goodwin | Apr. 16, 1867 |
| 1,006,886 | Spitzig | Oct. 24, 1911 |
| 2,123,327 | Biberthaler et al. | July 12, 1938 |
| 2,162,562 | Moore | June 13, 1939 |
| 2,174,577 | Friedman | Oct. 3, 1939 |
| 2,246,602 | Schultz et al. | June 24, 1941 |

FOREIGN PATENTS

| Number | Country | Date |
|---|---|---|
| 462,223 | France | Nov. 17, 1913 |
| 653,683 | Germany | Nov. 30, 1937 |